United States Patent
Yamasaki et al.

(10) Patent No.: US 6,242,066 B1
(45) Date of Patent: Jun. 5, 2001

(54) OPTICAL RECORDING MEDIUM, OPTICAL RECORDING AND REPRODUCING APPARATUS USING THE SAME AND MANUFACTURING METHOD OF OPTICAL RECORDING MEDIUM

(75) Inventors: Takeshi Yamasaki, Kanagawa; Tomomi Yukumoto, Chiba; Motohiro Furuki; Toshiyuki Kashiwagi, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/334,665

(22) Filed: Jun. 17, 1999

(30) Foreign Application Priority Data

Jun. 29, 1998 (JP) ................................. 10-182550

(51) Int. Cl.$^7$ ....................................... B32B 3/02
(52) U.S. Cl. ........................ 428/64.1; 428/64.4; 428/457; 428/913; 430/270.11; 430/495.1; 430/945; 369/112; 369/283
(58) Field of Search .................................. 428/64.1, 64.2, 428/64.4, 457, 913; 430/270.11, 495.11, 945; 369/112, 283

(56) References Cited

U.S. PATENT DOCUMENTS 5,757,758 * 5/1998 Yagi ..................................... 369/112

* cited by examiner

Primary Examiner—Elizabeth Evans
(74) Attorney, Agent, or Firm—Sonnenschein, Nath & Rosenthal (57) ABSTRACT

Such an optical recording medium is disclosed that includes at least one layer of an information layer (11) for which at least any of an optical recording or reproducing is performed with an optical parameter of N.A. (numerical aperture)/λ (wavelength)$\geq 1.2 [\mu m^{-1}]$, and in at least its information signal area, its focus error amount is equal to or less than $\pm \lambda/(N.A.)^2/8$ in a band equal to or more than a focus servo cut-off frequency of an optical recording and reproducing apparatus which performs at least any of the optical recording or reproducing while within $\pm \lambda/(N.A.)^2/4$ when only the reproduction is performed.

32 Claims, 6 Drawing Sheets

OPTICAL RECORDING MEDIUM, OPTICAL RECORDING AND REPRODUCING APPARATUS USING THE SAME AND MANUFACTURING METHOD OF OPTICAL RECORDING MEDIUM

RELATED APPLICATION DATA

The present application claims priority to Japanese Application No. P10-182550 filed Jun. 29, 1998, which application is incorporated herein by reference to the extent permitted by law.

BACKGROUND OF THE INVENTION

1. Field of the Invention

The present invention relates to an optical recording medium, an optical recording and reproducing apparatus using the optical recording medium, and a method of manufacturing an optical recording medium. In this case, the optical recording medium and the optical recording and reproducing apparatus designate an optical recording medium and an optical recording and reproducing apparatus to which at least any of the optical recording or reproducing is carried out, respectively. Further, the optical recording or reproducing is performed by using a laser light and a high density recording is particularly intended.

2. Description of the Related Art

When at least any of an optical recording or reproducing (hereinafter referred to as recording and reproducing simply) is performed for an optical recording medium by using a laser light, if it is assumed that the wavelength of the laser light is taken as $\lambda$ and the numerical aperture of a lens system, namely an objective lens of a recording and reproducing apparatus is taken as N.A., a spot diameter $\emptyset$ of recording and reproducing laser light is given by the following expression (1).

$$\emptyset = 1.22 \, \lambda/(N.A.) \quad (1)$$

Accordingly, if it is intended that a high density is made in an optical recording medium, e.g., an optical disk, it is effective that $\lambda$ is set small, that is, the wavelength is set short and the N.A. is set high.

As to a tolerance amount for a scattering of mechanical characteristics in the recording and reproducing apparatus, if the thickness of a light transmission layer on the laser light incident side of the optical recording medium is assumed as t, it is known that the following relations are established.

$$\text{Focal Depth } FD = \lambda/(N.A.)^2 \quad (2)$$

Tolerance (margin) of inclination (skew) of the optical recording medium $$SM \, \lambda/(N.A.)^3/t \quad (3)$$

Margin of thickness t of light transmission layer $$TM \, \lambda/(N.A.)^4 \quad (4)$$

Since in the recording and reproducing apparatus of a conventional CD ( compact disk), for example, $\lambda=0.78 \, \mu m$, N.A.=0.45 and from the above relation expressions, the followings are obtained
$\emptyset=2.11 \, \mu m$
FD=3.85 $\mu m$
SM=8.56 $\alpha/t$ ($\alpha$ is an arbitrary constant)
TM=19.02 $\beta$ ($\beta$ is an arbitrary constant)

Because in the recording and reproducing apparatus of a DVD (digital video disk) $\lambda=0.65 \, \mu m$, N.A.=0.6 and from the above relation expressions, the followings are obtained:
$\emptyset=1.32 \, \mu m$
FD=1.81 $\mu m$
SM=3.01 $\alpha/t$
TM=5.02 $\beta$ When respective values of the CD and the DVD are compared each other, the SM of DVD is about ⅓ time of the CD and hence it is necessary that the skew of DVD is suppressed to ⅓ for the conventional CD.

In fact, the skew standard of CD is 0.6° so that it is almost impossible to suppress the same to 0.2°.

Therefore, in order to correct the same, the thickness t of the light transmission layer is made to be 0.6 mm or an half of that of CD, whereby the skew margin SM is doubled to be the standard of 0.4°.

With respect to the margin of thickness irregularity, since the DVD is about ¼ or less for the CD, in comparison with the fact that the error of thickness of transparent plastic substrate corresponding to the light transmission layer on the laser incident side of the CD is set to be 100 $\mu m$, it is suppressed to be 30 $\mu m$ in the DVD. This value can be sufficiently manufactured by the conventional molding technique for the substrate.

As to the FD, the FD of DVD is about ½ of that of CD. It is also possible that a target information layer can be set within the focal depth by the conventional molding technique and bonding technique upon manufacturing a DVD.

However, since it is desired that the recording capacity is further increased from the recording capacity of 4.7 GB (giga byte) of DVD to improve the recording density, it is required that the N.A. is further increased from that of a conventional DVD. About this requirement, as proposed by Patent Application No. Hei 9-185130 by the same applicant of the present application, a high N.A. is proposed by a 2-group lens. In this case, it is confirmed that the N.A. can be made 0.9 higher than 0.7. Then, an optical parameter of this case is $N.A./\lambda \geq 1.2 \, [\mu m^{-1}]$, $\lambda \leq 0.68 \, \mu m$ and a thickness irregularity $\Delta t$ of light transmission layer is set within ±5.26 $\lambda/(N.A.)^4 \mu m$. If N.A.=0.85, for example, this is $\sqrt{2}$ times of N.A.=0.6. Therefore, even if a short wavelength laser light source is not used, the surface density can be made 2 times. Thus, if the modulation system same as that of DVD is employed, there is realized an optical recording disk, that is, an optical recording medium of 4.7×2=9.4 GB.

In this case, however, each of the margins mentioned above is decreased. That is, if $\lambda=0.64 \, \mu m$ is established, the following expressions are obtained from the above expressions (1) to (4):
$\emptyset=0.93 \, \mu m$
FD=0.90 $\mu m$
SM=1.06 $\alpha/t$
TM=5.02 $\beta$ In this way, when for the sake of presenting a high density, the N.A. is increased up to 0.85 as described above, for example, its SM is lowered by about ⅓ as compared with the DVD, its TM becomes about ⅕ and its FD becomes about ½ or margins become severe. Therefore, it becomes impossible to realize an optical recording medium with the structure same as that of the DVD as well as the conventional DC.

Further, if a laser light source with a wavelength of 400 nm or less than that is used, each of the above-mentioned margins is decreased further.

SUMMARY OF THE INVENTION

It is an object of the present invention to provide an optical recording medium corresponding to an objective lens of high N.A. and to a short wavelength light source, an optical recording and reproducing apparatus using the optical recording medium, and a manufacturing method of the optical recording medium.

According to an aspect of the present invention, there is provided an optical recording medium which comprises an information layer of at least one layer for which any one of at least recording or reproducing is carried out with an optical parameter of N.A. (numeral aperture)/$\lambda$ (wavelength)$\geq 1.2[[\mu m^{-1}]$, wherein in at least its information signal area, its focus error amount is within a range of $\pm\lambda/(N.A.)^2/8$ in a band equal to or more than a focus servo cut-off frequency of an optical recording and reproducing apparatus for performing at least any one of an optical recording or reproducing and within $\pm\lambda/(N.A.)^2/4$ when only the reproducing is performed.

According to another aspect of the present invention, there is provided an optical recording and reproducing apparatus for carrying out any one of an optical recording or reproduction by using the above-mentioned optical recording medium, which comprises a laser light source with a wavelength equal to or less than 680 nm, and a lens system satisfying $N.A./\lambda \geq 1.2[\mu m^{-1}]$.

The optical recording medium according to the present invention has a substrate made of plastic, metal, glass or the like with a thickness of 0.3 mm to 1.2 mm having a signal surface formed with a groove and a pit and one surface thereof and a reflection film or a recording film formed on the signal surface, and a sheet with a thickness of 44 $\mu$m to 114 $\mu$m as its center and a thickness irregularity within $\pm/\mu$m being bounded on the reflection film or recording film through an adhesive layer with a thickness equal to or less than 6 $\mu$m, wherein a laser light is made incident from the surface of the sheet, namely an opposite side to the substrate to thereby perform at least any one of an optical recording or reproducing.

The optical recording and reproducing apparatus of the present invention carries out at least any one of an optical recording or reproducing by using the optical recording medium and comprises a laser light source with a wavelength equal to or less than 680 nm, and a lens system satisfying $N.A./\lambda \geq 1.2[\mu m^{-1}]$.

According to a further aspect of the present invention, there is provided a method of manufacturing an optical recording medium, which comprises the steps of forming a reflection film or a recording film on a signal surface which is formed on at least one surface of a substrate with a thickness of 0.3 mm to 1.2 mm, and dropping an ultraviolet curing resin onto the reflection film or recording film, mounting thereon a plastic sheet, rotating the same at a high speed to remove a surplus of the ultraviolet curing resin, and bonding the plastic sheet by irradiating ultraviolet rays to thereby manufacture a target optical recording medium.

DESCRIPTION OF THE PREFERRED EMBODIMENTS

Figure 1:
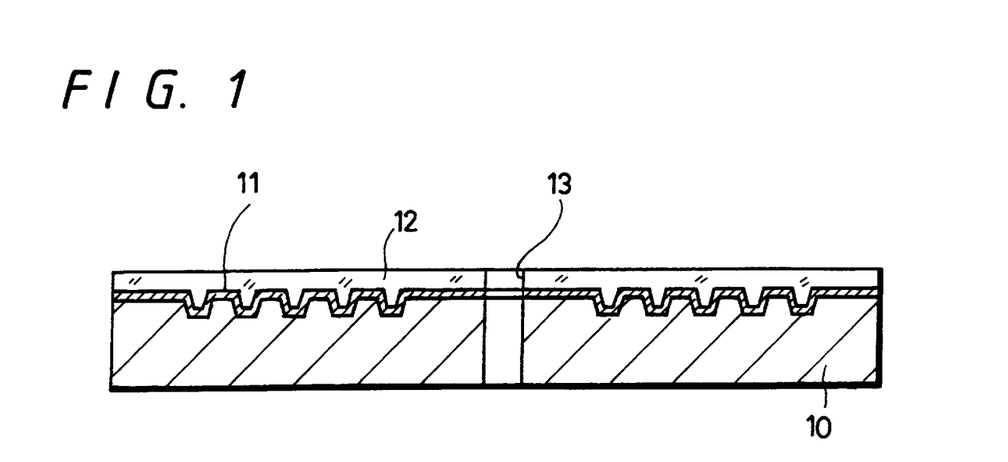
FIG. 1 is a schematic cross-sectional view showing an example of the optical recording medium according to the present invention.

An embodiment of an optical recording medium according to the present invention will be described with reference to FIG. 1 which is a schematic cross-sectional diagram of the embodiment. As shown in FIG. 1, on one surface of a substrate 10 such as a plastic substrate, a metal substrate, a glass substrate or the like there is formed an information layer 11 on which a light transmission layer 12 with a thickness t is formed. The example shown in FIG. 1 is a disk at the center of which a center aperture 13 is bored.

Figure 2:
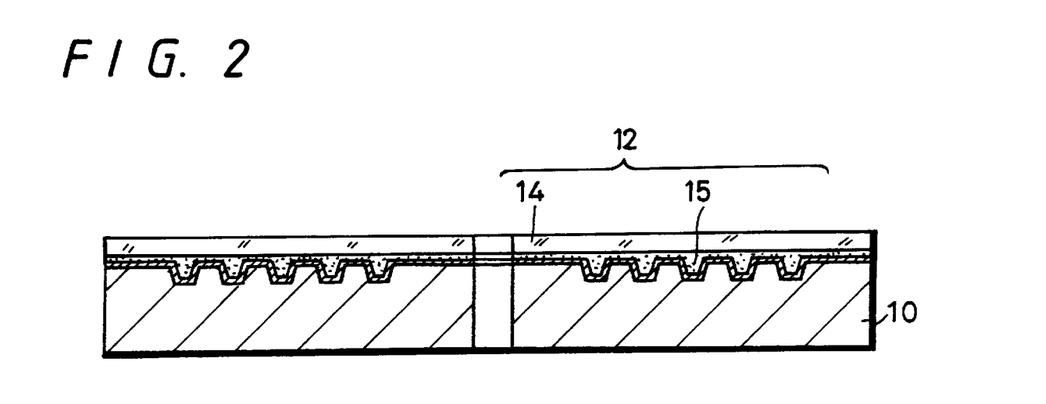
FIG. 2 is a schematic cross-sectional view showing another example of the optical recording medium according to the present invention.

FIG. 2 is a schematic cross-sectional view showing another embodiment of the optical recording medium according to the present invention. As shown in FIG. 2, in this embodiment, on the signal surface of a similar substrate 10 formed are a reflection film and a recording film on which a sheet 14 having the light transmission property is bonded via an adhesive layer 15 to thereby form a light transmission layer 12.

However, it is needless to say that the present invention is not limited to the above embodiments.

The optical recording medium of the present invention includes at least one layer of an information layer for which at least any of an optical recording or reproducing is performed with an optical parameter of N.A. (numeral aperture)/$\lambda$(wavelength)$\geq 1.2[[\mu m^{-1}]$. In at least its information signal area, its focus error is within $\pm\lambda/(N.A.)^2/8$ in a band equal to or more than the focus servo cut-off frequency of an optical recording and reproducing apparatus which performs at least any of an optical recording or reproducing and also within $\pm\lambda/(N.A.)^2/4$ when only the reproducing is carried out.

In the optical recording medium according to the present invention, on a signal surface formed on at lest one surface of a substrate with a thickness of 0.3 mm to 1.2 mm, there is formed a reflection film or a recording film on which formed is a light transmission layer with a thickness of 3 $\mu$m to 177 $\mu$m, preferably 50 $\mu$m to 120 $\mu$m.

The light transmission layer is formed such that its thickness irregularity $\Delta t$ is selected within $\pm 5.26\ \lambda/(N.A.)^4$.

Also, a track pitch P thereof is set to satisfy $P \leq 0.64\ \mu$m and a skew $\theta$ thereof is set to be within $\pm 0.4°$, namely $1\theta 1 \leq 0.4°$.

Further, a depth D of a groove or a pit is selected to satisfy, for example, $\lambda/8/n \leq D \leq 3\lambda/8/n$ (n is a refractive index of the light transmission layer) and a diameter thereof is set to be equal to or less than 130 mm, for example.

In the optical recording medium of the present invention, its recording capacity can be selected to be a line density equal to or more than 8 GB in a CD size and a single layer of an information layer.

Further, the transmittance of the light transmission layer may be set to be equal to or more than 70% with the $\lambda$ equal to or less than 780 nm.

The optical recording and reproducing apparatus according to the present invention is such an optical recording and reproducing apparatus which curries out any one of an optical recording or reproducing by a laser light with the wavelength λ and which uses an optical recording medium having at least one layer of an information layer in at least information signal area of which its focus error is within ±λ/(N.A.)²/4 in a band equal to or more than a focus servo cut-off frequency in a case of only reproducing being performed and within ±λ/(N.A.)²/8 in a case of a recording and a reproducing being performed. The optical recording and reproducing apparatus also includes a laser light source with the wavelength λ equal to or less than 680 nm and a lens system satisfying N.A./λ≧1.2[µm⁻¹].

In this case, λ≦450 nm may be set and the lens system satisfies N.A.≧0.78.

When such a lens system is formed of a 2-group lens system, N.A.≧0.80 can be obtained.

The optical recording medium of the present invention can be arranged such that on a signal surface formed on at least one surface of a substrate with a thickness of 0.3 mm to 1.2 mm there is formed a reflection film or a recording film on which a sheet with a thickness of (50-6)µm to (120-6)µm, namely 44 µm to 114 µm is bonded through an adhesive layer with a thickness equal to or less than 6 µm. A laser light can be incident thereto from the opposite side of the sheet to its signal surface forming side.

The adhesive layer may be made of an ultraviolet curing resin or a pressure sensitive adhesive.

The thickness irregularity of the sheet is set within ±0.5 µm.

The transmittance of the light transmission layer is set to be equal to or more than 70% when the λ is equal to or less than 780 nm.

Even in this case, in at least its information signal area, its focus error amount is set within ±λ/(N.A.)²/8 in a band equal to or more than a focus servo cut-off frequency of an recording and reproducing apparatus which performs at least any of an optical recording or reproducing.

The optical recording and reproducing apparatus according to the present invention is an optical recording and reproducing apparatus performing at least any of an optical recording or reproducing by a laser light with the wavelength λ and uses an optical recording medium in which on the signal surface formed on at least one surface of the substrate with the thickness of 0.3 mm to 1.2 mm mentioned above, there is formed a reflection film or a recording film and thereon bonded is a sheet with the thickness of 44 µm to 114 µm via the adhesive layer with the thickness equal to or less than 6 µm. The optical recording and reproducing apparatus further comprises a laser light source with the wavelength equal to or shorter than 680 nm and a lens system which satisfies N.A./λ≧1.2.

In the above arrangement, λ≦450 nm and N.A.≧0.60 may be presented. Also, the lens system thereof can be formed of a 2-group lens system.

Alternately, the lens system is made to satisfy N.A.≧0.80.

A method of manufacturing the optical recording medium with the arrangement shown in FIG. 2 according to the present invention has the process for forming a reflection film or a recording film on the signal surface formed on at lest one surface of a substrate made by the injection molding of, for example, polycarbonate and with the thickness of 0.3 mm to 1.2 mm, and the process for bonding a plastic sheet on the reflection film or the recording film by dropping an ultraviolet curing resin thereonto, mounting the plastic sheet thereon to remove a surplus ultraviolet curing resin by a high speed revolution, and irradiating ultraviolet rays thereon under that state to thereby obtain a target optical recording medium.

The reason why the thickness of the substrate is set to be 0.3 m to 1.2 mm is that when the optical recording medium is made same as an existing CD or the like, its thickness is 1.2 mm, and if the thickness is less than 0.3 mm, a problem will occur in the molding or handling upon manufacturing and so on.

The above-mentioned present invention will be described. Now, the case for realizing the memorizing capacity more than 8 GB will be explained. The memorizing capacity of the DVD mentioned before is 4.7 GB at the wavelength λ 0.65 µm and N.A.=0.6 so that in order to realize the memorizing capacity more than 8 GB, the following relation should be established.

$$4.7 \times (0.65/0.60 \times N.A./\lambda)^2 \geq 8$$

Thus, the optical parameter N.A./λ≧1.20 mentioned above is given.

As to the skew margin, the magazine of Patent application opening No. Hei 3-225650 shows SM is sufficient in a range of ±84.115°(λ/(N.A.)³/t). The above can be applied to the optical recording medium of the present invention.

Then, as described before, the practical critical value of SM is set to 0.4° reasonably.

Accordingly, it is considered how the thickness of the optical recording medium is set by shortening the wavelength λ of the laser light and making the N.A. high while SM=0.4° is set. First of all, when λ=0.65 µm, N.A. is required to be equal to or more than 0.78 from N.A./λ≧1.20 [µm⁻¹].

In the case where the laser light with a short wavelength λ=0.4 µm is used, if the condition N.A.≧0.78 is not changed, the thickness t of the light transmission layer becomes t=177 µm. In this case, if it is considered that the manufacturing equipment for a CD in which the thickness of substrate is 1.2 mm or the like is used as it is, the thickness of the whole optical disk becomes about 1.38 mm at maximum.

On the other hand, the lower limit of the light transmission layer is determined whether the protective function of light transmission layer having a role for protecting the recording film and the reflection film is maintained. In other words, if the reliability of optical recording medium and an influence by the collision of a 2-group lens described later on with the surface of the light transmission layer are considered, the lower limit is required equal to or more than 3 µm.

This is reason why the thickness of the light transmission layer is selected in a range of 3 µm to 177 µm.

In realizing a large capacity, the thickness t of the light transmission layer with N.A.=0.85 is required equal to or less than $$0.6 \times (0.6/0.85)^3 = 0.21 \text{ mm}$$

for obtaining a skew margin SM similar to the skew margin SM in the DVD.

Further, when a laser light source with the wavelength of about 0.4 µm is used, $$0.21 \times 0.4/0.65 = 0.129 \text{ mm}$$

is obtained and the thickness t of the light transmission layer becomes 0.12 mm, namely equal to or less than 120 µm.

On the other hand, when the thickness is less than 50 μm, there may be a fear that a problem of double refraction occurs in the plastic sheet. Therefore, the thickness is preferred to be equal to or more than 50 μm and hence the thickness of the light transmission layer is preferred in a range of 50 μm to 120 μm.

In order to obtain the recording capacity of 8 GB, the track pitch P and the line density d must be changed. In this case, it is sufficient to satisfy the following conditions:

$$(0.74/P) \times (0.267/d) \times 4.7 \geq 8$$

$$d \leq 0.1161/P \ (\mu m/bit)$$

When P=0.56 μm, the line density becomes d≦0.206 μm/bit, which uses a ROM (Read Only Memory) of DVD as a reference. Because by the improvement of signal process technique at recording and reproducing the line density could be increased by about 15% at present, the pitch can be increased and set to 0.64 μm at maximum.

Further, the tolerance is severe for a track pitch fluctuation ΔP. If the recording and reproducing parameter of CD and DVD is used as it is, from the track pitch of 0.74 μm and the tolerance of ±0.03 of the DVD the following conditions are obtained:

$$-0.03P/0.74 \leq \Delta P \leq 0.03P/0.74$$

$$-0.04P \leq \Delta P \leq +0.04P$$

Accordingly, when P=0.56, ΔP becomes within ±0.023 μm.

Next, the thickness irregularity of light transmission layer will be discussed. When the thickness of light transmission layer is displaced from the design center of a reproduction objective lens, the aberration amount applied to a laser light spot by its thickness irregularity is a fourth power of N.A. or in proportion to the wavelength λ.

Therefore, when the high recording density is aimed by making the N.A. high or shorting the wavelength, the thickness irregularity of the light transmission layer is severally restricted further.

As a practical system example, in the case of CD, N.A.=0.45 is realized and the standard of the thickness irregularity of the light transmission layer (substrate) is ±100 μm.

In the case of DVD, there are normalized N.A.=0.6 and ±30 μm, respectively.

When the tolerance amount +100 μm in the CD is taken as a reference, the thickness irregularity Δt is expressed by the following equation:

$$\Delta t = \pm (0.45/N.A.)^4 \times (\lambda/0.78) \times 100 \ \mu m = \pm 5.26 \times (\lambda/(N.A.)^4) \mu m$$

When an experiment of the relation between the thickness irregularity of light transmission layer and a jitter value is carried out by using a ROM disk of 10 GB, and the wavelength of 0.68 μm and N.A.=0.875 for the thickness of light transmission layer of 100 μm as a center, it is ascertained that the thickness irregularity of light transmission layer for presenting 8% which is a reference in the case where no vibration such as a skew or the like exists in, for example, the DVD is about ±7 μm. The value of thickness irregularity derived from the above equation is ±6 μm. A satisfactory signal can be obtained from a disk medium which satisfier the above standard.

By the way, since the skew margin SM can be corrected by the thickness of light transmission layer, in order to ensure the cope for the wavelength λ=400 nm and a wider SM under the thickness equal to or less than 0.2 mm which is ⅓ of the thickness 0.6 mm of light transmission layer in the DVD, the thickness t of light transmission layer is set to be 0.1 mm (100 μm).

The margin TM of thickness is about ⅕ of the above-mentioned thickness error 30 μm and further ±4 μm for cope with a short wavelength.

If the focal depth FD=0.90 μm for coping with the above-mentioned λ=0.65 μm is changed to cope with λ=400 nm, it becomes 0.90×0.4/0.65=0.553 μm.

This value is a focal depth of the recording and reproducing laser light and different from the focus error allowed to the optical recording medium. That is, the optical recording medium, for example, an optical disk has a so-called "surface movement" without failure and this surface movement includes frequency components. In general, at its low frequency component portion less than, for example, several hundreds kHz, the focus servo normally provided in the recording and reproducing apparatus can follows the same, and hence it can be removed.

However, since the focus servo can not follow the portion in a region higher than a cut-off frequency (for example, a cut-off frequency in the DVD is 2.4 kHz), the surface movement of the optical disk becomes a defocus as it is to thereby deteriorate the signal characteristic.

The defocus can be separated into the amount of the disk itself such as the above surface movement, the light transmission layer irregularity or the like and into the amount caused by the recording and reproducing apparatus itself such as an electrical noise, mechanical vibration or the like of the recording and reproducing apparatus. In other words, a half margin is distributed to the optical disk (optical recording medium) itself.

Since influences of two defocuses or the defocus upon recording and the defocus upon reproducing are affected on the apparatus side, the defocus becomes a half further. Also, because the defocus is symmetrical up and down with respect to a certain center value, it become half of it, or the value is required to be equal to or less than FD/2/2/2=±λ/(N.A.)²/8.

In view of these points, what extent the above-mentioned surface movement amount of the optical recording medium itself, namely the remaining amount after being removed by the focus servo can be reduced is considered. Then, from the above FD=0.553 μm, there is obtained $$0.553 \ \mu m/2/2/2 = 0.07 \ \mu m$$

Then, since the margin upon recording is not taken into consideration in a reproduction-only medium, it is sufficient within ±λ/(N.A.)²/4.

When the wavelength of laser light is λ=400 nm, it is desired that the optical characteristic of the optical recording medium, that is, the wavelength range indicating a high light transmission property of light transmission layer is extended to near 380 nm. However, even in a range where the light transmission characteristic is lowered by some extent, it can be compensated for by increasing an incident light amount.

Experimentally, the transmittance required for the light transmission layer is such one sufficient that, under the assumption that there is no loss by the reflection, the return light amount of an incident light amount through the optical recording medium is at least a half of the incident light amount. Therefore, the transmittance thereof is desired to be equal to or more than 70% with the thickness of the light transmission layer of 100 μm and for 380 nm≦λ≦780 nm.

From the above description, the target values of the present invention are as follows:
Center value of thickness of light transmission layer 100 μm
All thickness irregularity ±4 μm
Remaining amount after being removed by focus servo ±70 μm
For 380 nm≦λ≦780 nm, transmittance of equal to or more than 70%.

While an embodiment to obtain an optical recording medium which realizes the above target values will be described, the resent invention is not limited to this embodiment.

To achieve the above thickness irregularity of ±4 μm, if a sheet, for example, is used as the light transmission layer, the thickness irregularity of ±0.5 μm is enough as will be described later on. However, in view of a scattering margin upon mass-production, if it is set as ±1 μm and the thickness of adhesive layer is set to be equal to or less than 6 μm, the above-mentioned condition can be satisfied.

Embodiment 1

In this embodiment, manufactured is an optical disk of phase change type to which a red laser light (λ=650 nm) is used as its recording and reproducing laser light.

In this case, a stamper of land and groove arrangement with a track pitch of 0.45 μm is prepared. For this stamper, at first an original disk is manufactured as usual. Upon manufacturing the original disk, a photoresist layer is coated and formed on a glass substrate having a smooth surface and an exposure process is carried out therefor. This exposure is performed at a track pitch of 0.90 μm, and the width ratio between an exposed portion and a non-exposed portion after being developed is selected such that the exposed portion is 60% while the non-exposed portion is 40%.

The photoresist layer is developed and on its surface plated is a metal such as Ni or the like. Then, the metal is peeled off to make a stamper or this transfer is repeated to thereby make a stamper. In the stamper, the depth of its groove is set D and for the wavelength of the red laser light mention above, set is λ/6/n ≈70 nm.

A polycarbonate substrate with a diameter of 120 mm and a thickness of 1.2 mm is molded by an injection molding using the stamper.

On a signal surface of thus manufactured substrate where a groove is formed, a phase change is caused by a laser light irradiation to thereby form a phase change recording film whose optical characteristic is changed and which is made as an information layer.

Figure 3A:
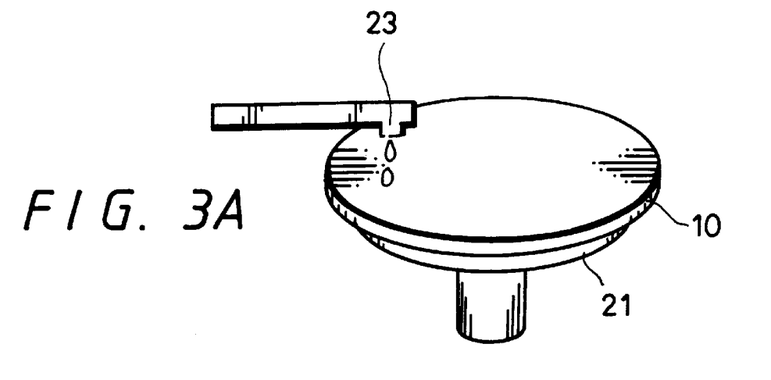
FIGS. 3A to 3C are process diagrams of a manufacturing method according to the present invention, respectively.

A substrate 10 on which the recording layer is formed is mounted, as shown in FIG. 3A, on a turntable 21 in such a manner that its side where the recording layer is formed is on an upper side and it is surely absorbed by a vacuum absorption means (not shown) located on the turntable 21.

Figure 4:
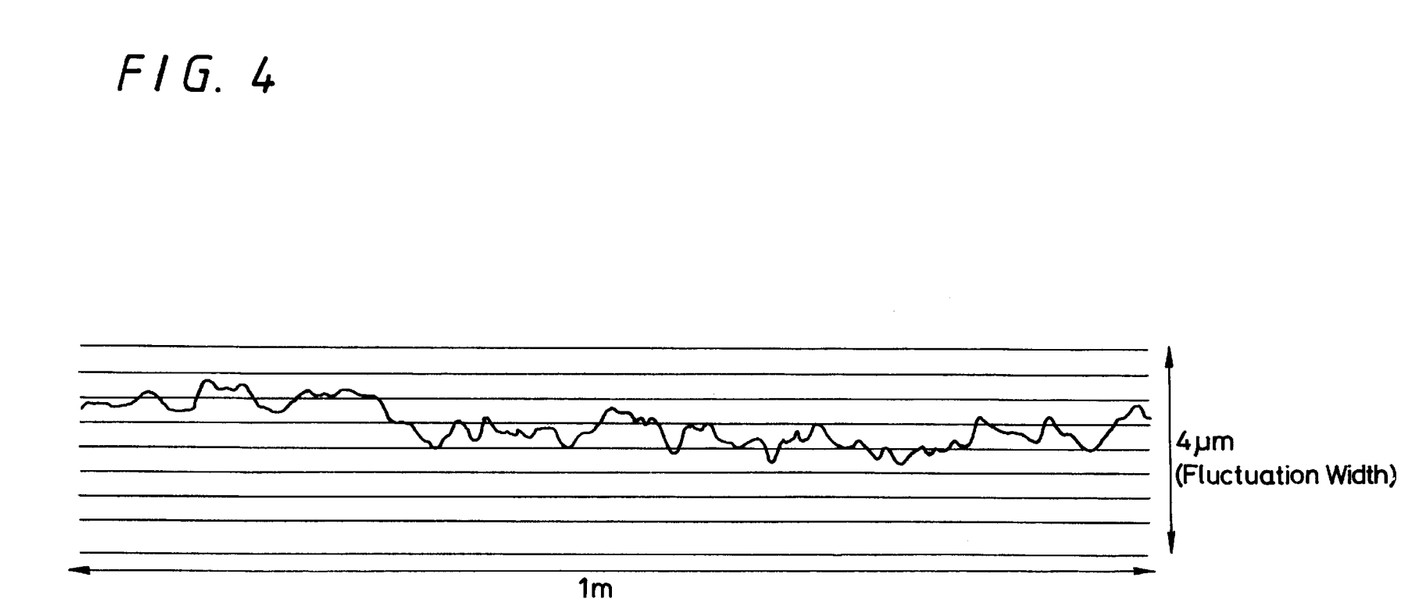
FIG. 4 is a graph showing a thickness irregularity measuring result of a sheet in the example of the optical recording medium according to the present invention.

On the other hand, from a polycarbonate sheet made by Teijin Corp. and with a thickness of 100 μm and a thickness irregularity of ±0.5 μm, there is prepared a sheet 22 with an outer diameter of 119 mm and a center aperture with an inner diameter of 40 mm at the center. FIG. 4 shows the measured thickness irregularity of the polycarbonate sheet which shows that the thickness irregularity falls in a range of ±0.5 μm.

Under the state that the substrate 10 is located on the turntable 21, it is rotated slowly at first and an ultraviolet curing resin is dropped onto a circle thereof with a diameter of 60 mm from a nozzle 23.

Figure 3B:
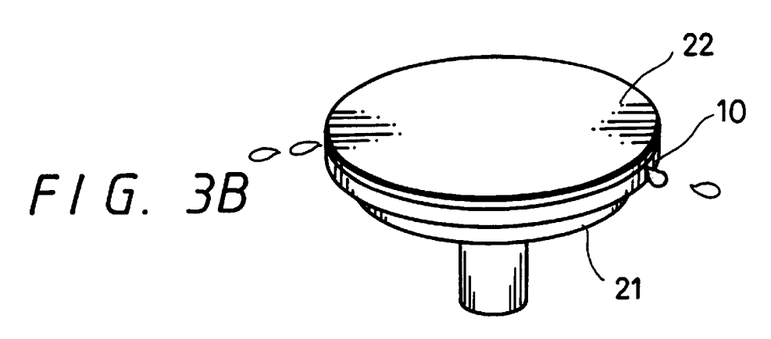

Next, as shown in FIG. 3B, the polycarbonate sheet 22 prepared as above mentioned is mounted thereon. At that time, the viscosity of the ultraviolet curing resin was 190 cps.

Figure 3C:
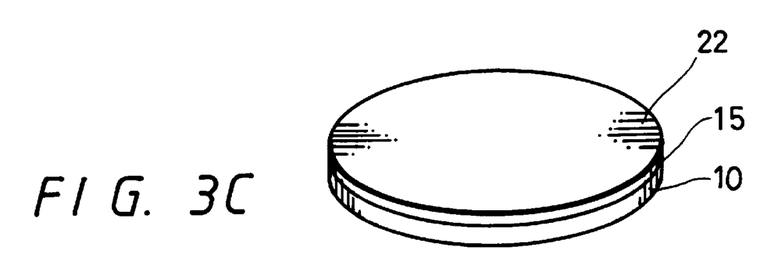

Under this state, the rotation speed of turntable 21 is raised up to 5000 rpm in 10 seconds and this rotation is kept for 60 seconds to remove surplus resin. Under this state, a lamp unit (not shown) for ultraviolet ray irradiation is brought to cover the sheet 22 on the substrate 10 to irradiate the ultraviolet rays thereon and to cure the ultraviolet curing resin. Thus, as shown in FIG. 3C and FIG. 2, manufactured is an optical recording medium, in this example, a phase change type optical disk in which the polycarbonate sheet 22 is bonded to the substrate 10 with the ultraviolet curing resin as the adhesive layer 15.

The thickness of the light transmission layer in the phase change type optical disk is such that its center value is 103 μm and the thickness irregularity is 5 μm p—p at the peak to peak value.

In this case, the removement time of resin is 60 seconds. However, when the removement time is 5 minutes, the thickness of the light transmission layer becomes such that its center value is 102 μm and the thickness irregularity is 2.5 μm p—p.

Thereafter, in order to increase the surface hardness, on the surface of sheet 22 spattered is SiN with a thickness of 150 nm. Then, the hardness is increased from the B state to the H state in pencil hardness.

The surface process to increase the hardness may be carried out to coat, for example, the ultraviolet curing resin on the sheet 22 in advance up to 2 μm.

Even in this case, the similar effects can be obtained.

Figure 5:
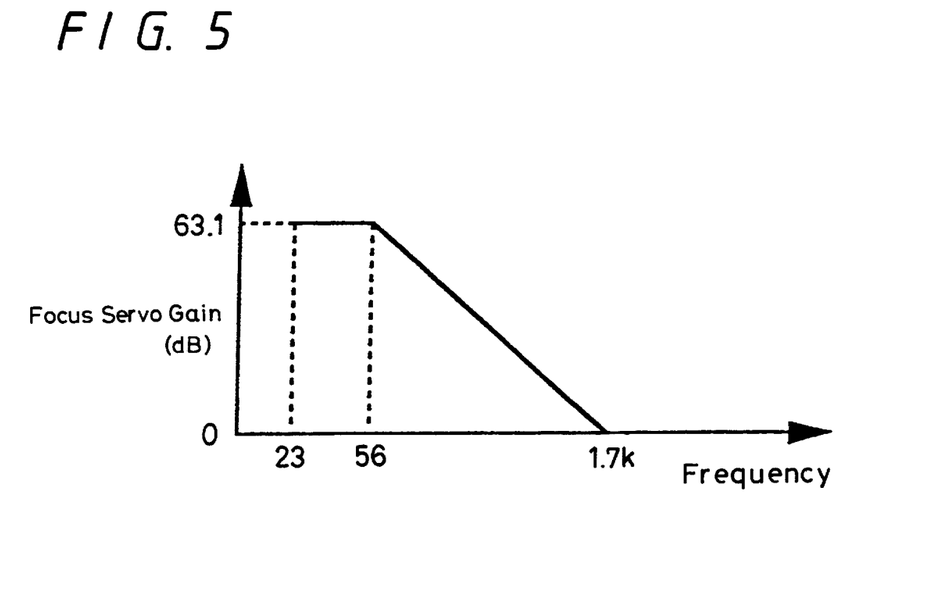
FIG. 5 is a graph showing a servo frequency characteristic of a recording medium used for measuring the characteristic of the optical recording medium according to the present invention.
Figure 6:
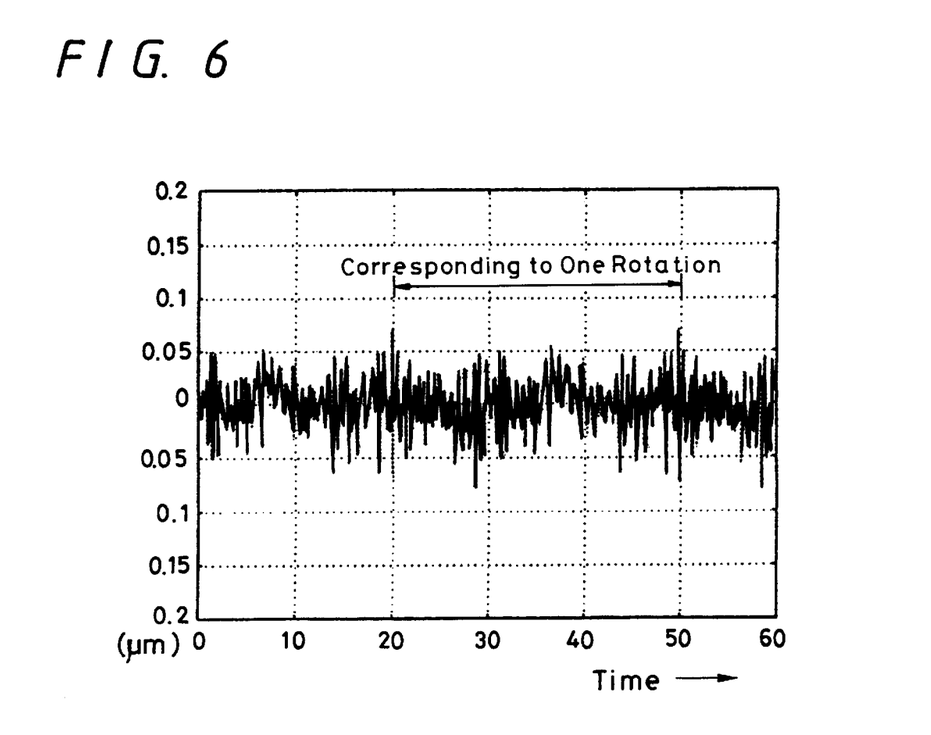
FIG. 6 is a graph showing a measured result of a remaining amount of a focus servo after being removed.

The optical recording medium, namely the optical disk thus made is estimated in the remaining amount of the removement by the focus servo at a line velocity of 8.42 m/s by an optical recording and reproducing apparatus having the focus servo characteristic shown in FIG. 5, that is, an optical recording and reproducing apparatus with the focus servo cut-off frequency of 1.7 kHz. FIG. 6 shows the measured result thereof by which it is confirmed that the remaining amount of the removement is in a range of ±0.07 μm. This remaining amount of removement can not be suppressed at all when exceeding the cut-off frequency 1.7 kHz but suppressed according to the characteristic when lower than 1.7 kHz, and hence there are contained some what of frequency components lower than the cut-off frequency.

Inspite of estimation under such a severe condition, sufficiently excellent values can be obtained as follows:

tolerable value of focus error with λ=0.65 μm $$+0.65/0.85^2/8=\pm0.11\ \mu m$$

tolerable value of focus error with λ=0.40 μm $$\pm0.40/0.85^2/8=\pm0.07\ \mu m$$

Thus, it may be understood that the optical recording medium by the above embodiment 1 can cope with the short wavelength laser light sufficiently.

Figure 7:
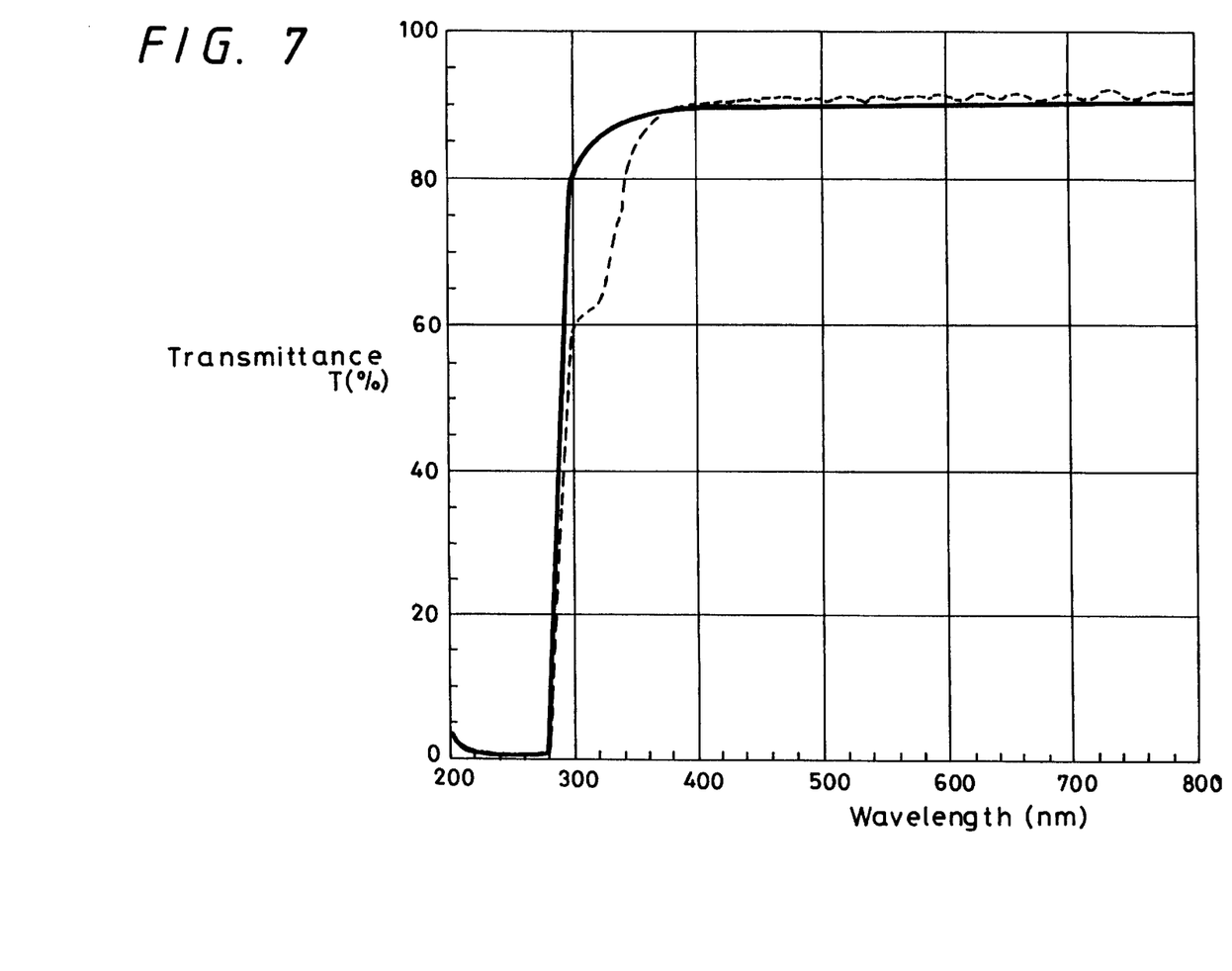
FIG. 7 is a graph showing a measured result of wavelength dependency of transmittance of the sheet.

FIG. 7 is the graph which shows the measured result of wavelength dependency of transmittance. In FIG. 7, a solid line curve is in a case of a polycarbonate sheet single body of 100 μm and a broken line curve is in a case where the ultraviolet curing resin is coated on the sheet up to 4 μm. In case of the polycarbonate single body, the transmittance is equal to or more than 80% for the wavelength up to 300 nm, while even in the case of the ultraviolet curing resin of 4 μm being coated, the transmittance is equal to or more than 80% up to the wavelength up to 340 nm. That is, it was ascertained that this light transmission layer can sufficiently cope with the short wavelength laser light.

Further, the optical disk is recorded and reproduced by an optical recording and reproducing apparatus having a 2-group lens system of wavelength of 650 nm and N.A.= 0.85.

Figure 8:
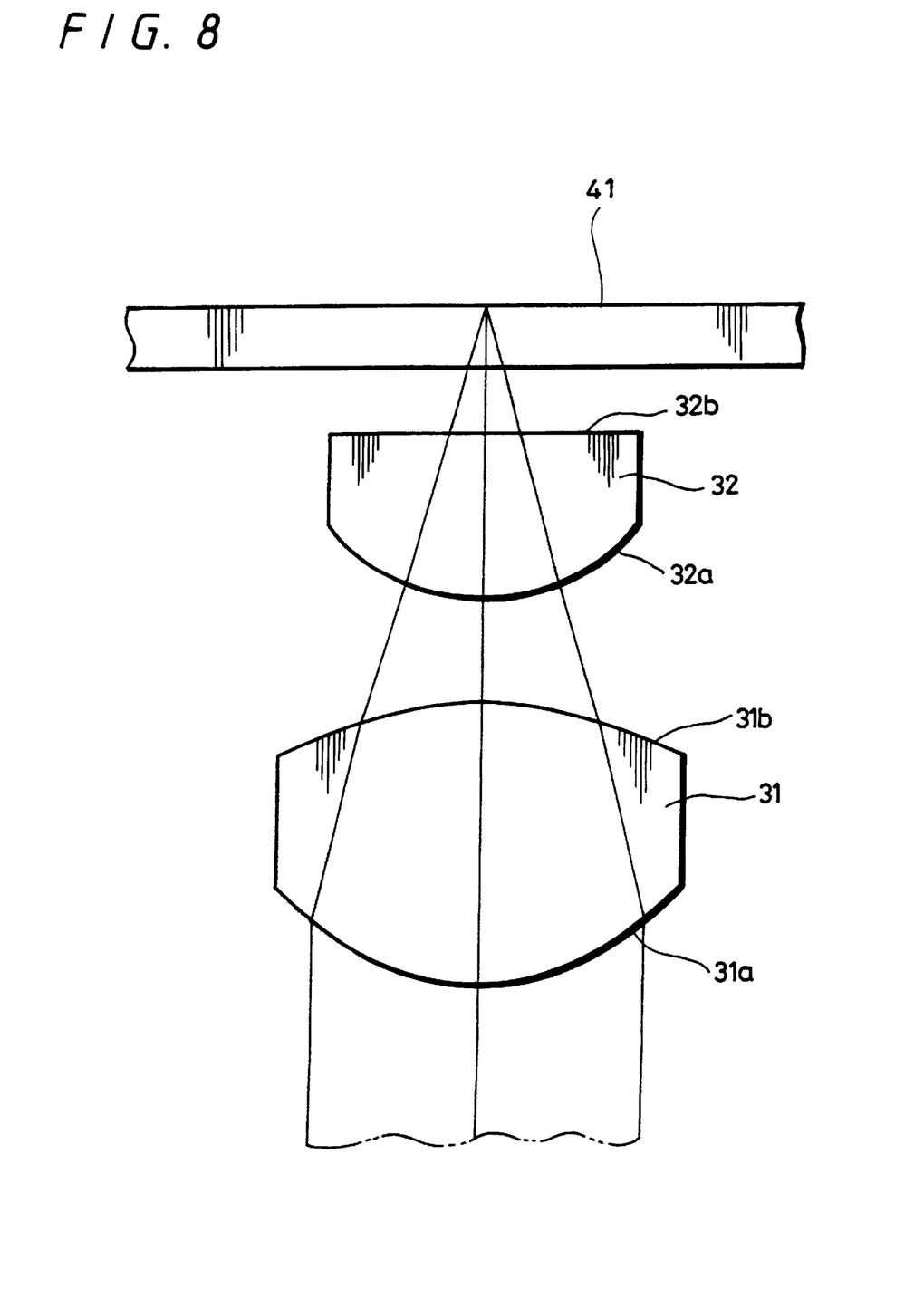
FIG. 8 is a schematic diagram showing the outline of the optical recording and reproducing apparatus using a 2-group lens system according to the present invention.

The optical recording and reproducing apparatus having the 2-group lens system is such one that, as shown in FIG.

8 which illustrates the outline thereof, an objective lens for an optical recording medium 41 is a 2-group lens comprised of first and second lenses 31 and 32 which can realize a high N.A..

Then, when the recording and reproducing is carried out at a line density of 0.20 μm/bit and 1–7 modulation, an excellent signal with a jitter of 8% can be recorded and reproduced.

Embodiment 2

In this embodiment, an optical recording medium for coping with a blue (λ=407 nm) laser light is manufactured.

In this case, a stamper of land-groove arrangement with a track pitch of 0.33 μm is made. The exposure upon making an original disk for making the stamper is carried out at a track pitch of 0.66μm, and the ratio between an exposed portion and a non-exposed portion after being developed is selected such one that the exposed portion is 65% while the non-exposed portion is 35%.

Further, the depth D of groove is λ/6/n ≈45 nm.

By using the stamper thus made and by a similar method to the embodiment 1, an optical disk is manufacture.

In this case, also the estimation similar to the embodiment 1 is carried out. In that case, a Kr laser (λ=407 nm) is used as a recording and reproducing laser source, and the recording and reproducing is performed by the recording and reproducing apparatus of 2-group lens with N.A.=0.85 shown in FIG. 8. In this case, it employs the line density of 0.18 μm/bit and 1–7 modulation. Then, an excellent signal with a jitter of 8% can be recorded and reproduced.

Embodiment 3

In this embodiment, a ROM (Read Only Memory) arrangement is made as the optical recording medium.

In this case, an EFM signal is recorded at a track pitch of 0.50 μm and a line density of 0.18 μm/bit. The depth of a pit is made as λ/4/n ≈100 nm for a recording and reproducing laser light of 650 nm. An Ar laser light of 351 nm is used for the exposure, a recording is performed by an objective lens of N.A.=0.9, a stamper is made by the method similar to that described in the embodiment 1, and a polycarbonate substrate 10 with a diameter of 120 mm and a thickness of 1.2 mm is made by the injection molding with the stamper. On a signal surface or pit forming surface of the substrate thus made, formed is an Al film of 30 to 40 nm by an ion-beam spattering method.

The disk formed with the reflection film is mounted on the turntable 21 described in FIG. 3 with the reflection film being on the turntable 21 side, and vacuum-absorbed. Then, by the similar method to the embodiment 1, a polycarbonate sheet is bounded to thereby manufacturing an optical recording medium, namely a ROM type optical disk in this embodiment.

An estimation is performed for the optical disk thus manufactured by a method similar to that explained in the embodiment 1. When the optical disk is recorded and reproduced by a 2-group lens with the wavelength of 650 nm and N.A.=0.85, an excellent signal with a jitter of 6.5% can be reproduced.

As described above, according to the present invention, the deterioration of signal by the defocus can be reduced.

Further, according to the manufacturing method of the present invention, the sheet 14 forming the light transmission layer is bonded by curing the resin bonding the sheet 14 during the high speed rotation, so that the thickness irregularity can be set to ±3 μm easily.

In each of the above-mentioned embodiments, although such a case is described that the optical recording medium in which on one surface of injection molding type substrate with the thickness of 1.2 mm formed is the information layer is obtained, it may be possible to produce a double-sided optical recording medium in which, for example, two light transmission layers 12 each with the thickness of 100 μm are formed by a similar process and are bonded to a substrate with the thickness of 0.6 mm on the opposite sides where the light transmission layer 12 is formed.

Alternately, it is possible to manufacture a double-sided optical recording medium by forming an information layer on the both surfaces of one substrate at the same time upon, for example, molding the substrate.

By the way, while the above examples are the case where the substrate is made by the injection molding of the polycarbonate, it is possible to make the same by using a Zeonex (Trade name made by Japan Zeonex Corp, water absorption rate of 0.01%) low in water absorption property as compared with the polycarbonate.

Alternately, a water proofing process is possible by forming a metal film of Al or the like and an organic film of $SiO_2$ or the like on the side of polycarbonate substrate opposite to the side where the information layer is formed.

Also, in the 2-group lens shown in FIG. 8, such a case is shown in which each of lenses 31a, 31b, 32a, 32b is made of a single lens having a give curved surface, but it is possible to construct the first and second lens groups 31 and 32 by a plurality of lenses.

As described above, the optical recording medium according to the present invention can reduce the deterioration of signal caused by the defocus and a high density optical disk for a short wavelength or high N.A. can be made in a mass-production fashion.

Further, according to the manufacturing method of the present invention, the bonding of sheet 14 forming the light transmission layer is carried out by curing the resin bonding the sheet 14 during the high speed rotation, so that its thickness irregularity can be made to be ±3 μm easily. Thus, the mass-reproducibility can be realized with ease by the increased margin.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An optical recording medium, comprising:
an information layer of at least one layer for which any one of at least recording and reproducing is carried out with an optical parameter of N.A. (numeral aperture)/λ (wavelength)≧1.2[μm$^{-1}$], wherein in at least its information signal area, its focus error amount is within a range of ±λ/(N.A.)$^2$/4 in a band equal to or more than a focus servo cut-off frequency of an optical reproducing apparatus.

2. An optical recording medium, comprising:
an information layer of at least one layer for which any one of at least recording and reproducing is carried out with an optical parameter of N.A.(numeral aperture)/λ (wavelength)≧1.2 [μm$^{-1}$], wherein in at least its information signal area, its focus error amount is within a range of ±λ/(N.A.)$^2$/8 in a band equal to or more than a focus servo cut-off frequency of an optical recording and reproducing apparatus.

3. An optical recording medium as claimed in claim 1, wherein on a signal surface formed on at least one surface of a substrate a reflection film or a recording film is formed and thereon a light transmission layer of 3 to 177 μm is formed.

4. An optical recording medium as claimed in claim 2, wherein on a signal surface formed on at least one surface of a substrate a reflection film or a recording film is formed and thereon a light transmission layer of 3 to 177 μm is formed.

5. An optical recording medium as claimed in claim 3, wherein a thickness irregularity Δt of said light transmission layer is set to $$|\Delta t|^2 \leq 5.26\, \lambda/(N.A.)^4 [\mu m].$$

6. An optical recording medium as claimed in claim 4, wherein a thickness irregularity Δt is set to $$|\Delta t|^2 \leq 5.26\, \lambda/(N.A.)^4 [\mu m].$$

7. An optical recording medium as claimed in claim 1, wherein a track pitch P and a skew θ are selected to satisfy P≦0.64 μm
θ≦0.4°.

8. An optical recording medium as claimed in claim 2, wherein a track pitch P and a skew θ are selected to satisfy P≦0.64 μm
|θ|≦0.4°.

9. An optical recording medium as claimed in claim 1, wherein a line density is selected such that a recording capacity in an information layer of a single layer with a size corresponding to a compact disk (CD) is equal to or more than 8 GB.

10. An optical recording medium as claimed in claim 2, wherein a line density is selected such that a recording capacity in an information layer of a single layer with a size corresponding to a compact disk (CD) is equal to or more than 8 GB.

11. An optical recording medium as claimed in claim 3, wherein a transmittance of said light transmission layer is set equal to or more than 70% when λ is equal to or less than 780 nm.

12. An optical recording medium as claimed in claim 4, wherein a transmittance of said light transmission layer is set equal to or more than 70% when λ is equal to or less than 780 nm.

13. An optical recording and reproducing apparatus for carrying out an optical reproduction by a laser light with a wavelength λ using such an optical recording medium which has an information layer of at least one layer and in which in at least its information signal area, a focus error amount is within a range of ±λ/(N.A.)²/4 (N.A. is a numeral aperture) in a band equal to or more than a focus cut-off frequency, comprising:

a laser light source with a wavelength λ equal to or less than 680 nm; and a lens system satisfying N.A./λ≧1.2[μm⁻¹].

14. An optical recording and reproducing apparatus for carrying out at least any one of an optical recording or reproduction by a laser light with a wavelength λ using such an optical recording medium which has an information layer of at least one layer and in which in at least its information signal area, a focus error amount is within a range of ±λ/(N.A.)²/8 (N.A. is a numeral aperture) in a band equal to or more than a focus cut-off frequency, comprising:

a laser light source with a wavelength λ equal to or less than 680 nm; and a lens system satisfying N.A./λ≧1.2[μm⁻¹].

15. An optical recording and reproducing apparatus as claimed in claim 13, wherein λ≦450 nm is satisfied.

16. An optical recording and reproducing apparatus as claimed in claim 14, wherein λ≦450 nm is satisfied.

17. An optical recording and reproducing apparatus as claimed in claim 13, wherein said lens system is comprised of a 2-group lens system.

18. An optical recording and reproducing apparatus as claimed in claim 14, wherein said lens system is comprised of a 2-group lens system.

19. An optical recording and reproducing apparatus as claimed in claim 13, wherein said lens system is made to satisfy N.A.≧0.78.

20. An optical recording and reproducing apparatus as claimed in claim 14, wherein said lens system is made to satisfy N.A.≧0.78.

21. An optical recording medium, comprising:

a substrate with a thickness of 0.3 mm to 1.2 mm having a signal surface formed on at least one surface thereof and a reflection film or a recording film formed on said signal surface; and a sheet with a thickness of 44 μm to 114 μm as its center and a thickness irregularity within ±1 μm being bonded on said reflection film or recording film through an adhesive layer with a thickness equal to or less than 6 μm, wherein a laser light is made incident from an opposite side of said sheet to a forming surface of said signal surface.

22. An optical recording medium as claimed in claim 21, wherein said adhesive layer is made of an ultraviolet curing resin.

23. An optical recording medium as claimed in claim 21, wherein said adhesive layer is made of a pressure sensitive adhesive.

24. An optical recording medium as claimed in claim 21, wherein the thickness irregularity of said sheet on the same substrate surface is made within ±0.5 μm.

25. An optical recording medium as claimed in claim 21, wherein a transmittance of a light transmission layer is set equal to or more than 70% with λ equal to or less than 780 nm.

26. An optical recording medium as claimed in claim 21, wherein in at least its information signal area, its focus error amount is set within ±λ/(N.A.)²/4 in a band equal to or more than a focus servo cut-off frequency of an optical reproduction apparatus.

27. An optical recording medium as claimed in claim 21, wherein in at least its information signal area, its focus error amount is set within ±λ/(N.A.)²/8 in a band equal to or more than a focus servo cut-off frequency of an optical recording and reproducing apparatus for carrying out at least any one of an optical recording or reproducing.

28. An optical recording and reproducing apparatus which carries out at least any one of an optical recording or reproducing by a laser light with a wavelength λ and uses an optical recording medium in which on a signal surface formed on at least one surface of a substrate with a thickness of 0.3 mm to 1.2 mm, a reflection film or a recording film is formed and thereon a sheet with a thickness irregularity of ±1 μm is bonded through an adhesive layer with a thickness equal to or less than 6 μm, comprising:

a laser light source with a wavelength λ equal to or less than 680 nm; and a lens system satisfying N.A./λ≧1.2.

29. An optical recording and reproducing apparatus as claimed in claim 28, wherein λ≦450 nm and N.A.≧0.60 are satisfied.

30. An optical recording and reproducing apparatus as claimed in claim 28, wherein said lens system is comprised of a 2-group lens system.

31. An optical recording and reproducing apparatus as claimed in claim 8, wherein said lens system is made to satisfy $N.A. \geq 0.80$.

32. A method of manufacturing an optical recording medium, comprising the steps of:

forming a reflection film or a recording film on a signal surface which is formed on at least one surface of a substrate with a thickness of 0.3 mm to 1.2 mm; and dropping an ultraviolet curing resin onto said reflection film or recording film, mounting thereon a plastic sheet, rotating the same at a high speed to remove a surplus of said ultraviolet curing resin, and bonding said plastic sheet by irradiating ultraviolet rays while rotating the same under that state.

* * * * *